United States Patent [19]

Leech

[11] Patent Number: 5,745,577
[45] Date of Patent: Apr. 28, 1998

[54] SYMMETRIC CRYPTOGRAPHIC SYSTEM FOR DATA ENCRYPTION

[75] Inventor: Marcus D. Leech, Smiths Falls, Canada

[73] Assignee: Northern Telecom Limited, Montreal, Canada

[21] Appl. No.: 687,303

[22] Filed: Jul. 25, 1996

[51] Int. Cl.$^6$ ............... H04L 9/28; H04L 9/06; H04L 9/00
[52] U.S. Cl. .................. 380/28; 380/9; 380/29; 380/37; 380/43; 380/49
[58] Field of Search ................ 380/9, 28, 29, 380/37, 43, 49, 50

[56] References Cited

U.S. PATENT DOCUMENTS

| | | | |
|---|---|---|---|
| 4,319,079 | 3/1982 | Best | 380/37 X |
| 4,776,011 | 10/1988 | Busby | 380/37 |
| 5,231,662 | 7/1993 | Van Rumpt et al. | 380/9 |
| 5,317,638 | 5/1994 | Kao et al. | 380/29 |
| 5,442,705 | 8/1995 | Miyano | 380/29 |
| 5,511,123 | 4/1996 | Adams et al. | 380/29 |

OTHER PUBLICATIONS

"Differential Cryptanalysis of the Full 16-round DES", E. Biham and A. Shamir, Advances in Cryptology, Proceedings of CRYPTO '92, Springer-Verlag, pp. 487–496.

"On the Resistance of the CAST Encryption Algorithm to Differential Cryptanalysis", J. Lee et al, SAC '95: Workshop Records, pp. 107–119.

Primary Examiner—Bernarr E. Gregory
Attorney, Agent, or Firm—Yoshiharu Toyooka

[57] ABSTRACT

A novel symmetric cryptographic system for data encryption uses two different sets of (m×n) s-boxes in its round function in one embodiment, where m and n are different integers. It also includes a set of expansion boxes to expand a half data block in a specific way. The expansion boxes are also (m×n) s-boxes. The cryptographic system of the invention is used in a feedback mode for generating better key schedules from a key.

16 Claims, 16 Drawing Sheets

Input Key (128 bits)

= Not used

```
                         Example S[0]

Example S[1]:

… # SYMMETRIC CRYPTOGRAPHIC SYSTEM FOR DATA ENCRYPTION

FIELD OF THE INVENTION

The present invention is directed to a cryptographic system to be used in digital data processing. In particular, it is directed to the cryptographic system which includes a novel block cipher technique. It is further directed to a novel key schedule generation using the novel block cipher technique.

BACKGROUND OF THE INVENTION

The basic function provided by a cryptographic system (or cryptosystem) is encipherment/decipherment. A cryptosystem can be considered to consist of a pair of data transformations—the first transformation is applied to a data item, known as plaintext (or cleartext), and generates a new (unintelligible) data item called ciphertext. The other transformation, applied to ciphertext, results in the regeneration of the original plaintext. An encipherment transformation uses as input both the plaintext data and an independent data value known as an encipherment key. Similarly, a decipherment transformation uses a decipherment key. These keys are seemingly random bit-vectors. The symmetric cryptosystems e.g., DES (U.S. Data Encryption Standard), use the same key in the encipherment and decipherment transformation.

FIGS. 1 and 2 are algorithmic flow charts of the DES enciphering process. The DES algorithm employs a 56-bit key and operates on 64-bit blocks of data. Referring to FIG. 1, the encipherment process begins at an initial permutation 10 of a block of 64 bits of plaintext which is then divided into two 32-bit halves. One half (e.g., Right half $R_0$ at the first round) is used as input to a key-dependent round function 12 (e.g. $f_0$) which takes internal key $K_0$ as a second input, and the result (e.g. $R'_0$) is exclusive-ORed (XORed or summed modulo 2) 14 to the other half (e.g. Left half $L_0$). After one such iteration, or round, the two halves of the data are swapped and the operation is performed again. After n (e.g. 16) rounds of computation, the output is put through a final permutation 16 to generate the ciphertext which is 64 bits long. The round function includes passes through eight nonlinear substitutions known as s-boxes and will be described in more detail in FIG. 2, in which the round function $f_i$ of the i-th round (i=0, 1, 2, . . . , 15) is shown. The function takes two inputs, the right half $R_i$ of the block and an internal key $K_i$, and generates an output $R'_i$. The initial key is 56 bits long from which 48 bits are selected at each round according to a predetermined key schedule 20 to generate the internal key $K_i$. The right half $R_i$ is first expanded at 22 from 32 bits to 48 bits and XORed 24 with the internal key $K_i$. The result is divided into eight parts and is applied to eight different s-boxes 26. The s-boxes are nonlinear substitutions, mapping 6 input bits into 4 output bits. The eight outputs of the s-boxes are concatenated at 28 and then permuted at 30 to yield an output $R'_i$ 32 which will be XORed with the left half $L_i$ as shown in FIG. 1. The set of internal keys (also called subkeys) $K_0, K_1, K_2, \ldots K_{14}$ and $K_{15}$ is called a key schedule.

The decipherment process is of the same form as the encipherment process, except that the internal keys for the 16 rounds are in reverse order e.g., $K_{15}, K_{14}, \ldots K_1$ and $K_0$.

The ciphertext displays no correlation to the plaintext. Every bit of the output depends upon every bit of the input and on every bit of the key. The security of DES depends primarily upon the non-linear s-boxes, since the remaining parts of the algorithm are all linear and thus easily attacked. It does not, however, depend on the secrecy of the algorithm, since the complete algorithm, including the contents of the s-boxes, is public knowledge.

The strength of DES has been a controversial issue and many attacks have been debated. In an article entitled "Differential Cryptanalysis of the Full 16-round DES" in Advances in Cryptology, Proceedings of CRYPTO '92, Springer-Verlag, pp 487–496, E. Biham and A. Shamir describe a cryptanalytic attack that can break DES using $2^{47}$ chosen plaintexts. Their differential cryptanalysis is based on the principle that when the XOR of two plaintexts is equal to a specific value, it is possible to perform a statistical attack on the key given the two plaintexts and their corresponding ciphertexts. The statistical attack is possible because the s-boxes, while nonlinear, generate a highly skewed distribution of XOR outputs for given XOR inputs. For example, S1 maps the XOR input of "30" hexadecimal to an XOR output of "4" with probability ¼. Since the output of an s-box is 4-bits, an even distribution would map each input XOR into each output XOR with probability 1/16.

U.S. Pat. No. 5,511,123, issued Apr. 23, 1996 (Adams et al), describes a new symmetric cryptosystem which employs (m×n) s-boxes, where m and n are positive integers and m<<n. This cryptosystem is now generally known as CAST and gives better performance.

FIG. 3 shows the algorithmic structure of CAST according to its one embodiment. The data blocksize of plaintext is set at 64 and is initially broken into halves of length 32. At each round, one half is modified, is added modulo 2 to the other half, and the two halves are interchanged. After 8 rounds the two halves are concatenated to form the ciphertext. Unlike DES, there are no permutation layers. As well, the modification (round function) of a half data block at each round is implemented completely differently from DES. Referring to FIG. 4, in CAST, the round function contains six (8×32) partially bent-function-based s-boxes from separate compatibility classes. The internal key $K_i$ for round i is broken into two 8-bit pieces. Each of the two pieces of the internal key is input to each of two separate (8×32) s-boxes and the 32-bit outputs are XORed to form the 32-bit modified internal key. The 32-bit modified internal key is XORed with the half data block $R_i$ to generate a 32-bit first modified half data bloc $R''_i$, which is then broken into four 8-bit pieces. Each of the four 8-bit pieces is input to each of four separate (8×32) s-boxes and all the 32-bit outputs of the four s-boxes are XORed to produce a 32 second modified half data block $R'_i$. The second modified half data block is then XORed with the remaining half of the data block to generate a transformed half data block of the round.

The present invention is a novel symmetric cryptosystem which uses two or more different sets of (m×n) s-boxes and novel key schedules, where m and n are different integers.

OBJECTS OF THE INVENTION

It is therefore an object of the invention to provide a cryptographic system which is immune to differential and linear cryptanalysis.

It is another object of the invention to provide a cryptographic system which employs two or more different sets of (m×n) s-boxes where m and n are different integers.

It is a further object of the invention to provide a novel internal key scheduling mechanism which generates no weak or semi-weak encryption keys.

SUMMARY OF THE INVENTION

Briefly stated, the invention resides in a symmetric cryptographic encryption. According to one aspect, it is directed to a method of generating a key schedule from a key of a predetermined bitlength. The method comprises a step of processing the key through a block cipher operation using a preset key schedule to generate an intermediate key schedule, each block cipher operation comprising a plurality of iterative transformation rounds each of which in turn includes a round function. The method includes further steps of, after each block cipher operation, replacing a part of the preset key schedule with a part of the intermediate key schedule; and repeating a predetermined number of block cipher operation to generate the key schedule.

According to another aspect, the invention is directed to a data encryption method of cryptographically transforming between plaintext and ciphertext in data blocks of a predetermined bitlength in which the data blocks are processed one data block after another in sequence through a set of a plurality of consecutive transformation rounds. Each consecutive transformation round comprising steps of expanding a half of a data block and XORing the half of said data block with a subkey to generate a first modified half data block. The consecutive transformation round further includes steps of processing the first modified half data block by two or more sets of a plurality of different substitution boxes to generate a second modified half data block and XORing the second modified half data block with the remaining half of said data block to generate a transformed half data block of a transformation round.

According to a further aspect, the invention is directed to a data encryption system for cryptographically transforming between plaintext and ciphertext in data blocks of a predetermined bitlength by performing a plurality of consecutive transformation rounds of half of each data block. The data encryption system comprises a first set of a plurality of "m×n" s-boxes where m and n are different integers for processing each half data block to expand the same to a predetermined bitlength and a first XOR gate for XORing a subkey and the expanded half data block to generate a first transformed half data block of the transformation round. The data encryption system further includes a second set of "p×q" s-boxes and a third set of "q×r" s-boxes where p, q and r are different integers for processing the first transformed half data block to generate a second transformed half data block; and a second XOR gate for XORing the second transformed half data block to generate a transformed half data block of one of the consecutive transformation rounds.

BRIEF DESCRIPTION OF THE DRAWING

For a more complete understanding of the invention and for further objects and advantages thereof, reference may now be made to the following description, taken in conjunction with the accompanying drawings, in which:

FIGS. 10 and 11 are two examples of ES( ) s-boxes designed for the invention; and FIGS. 12a, 12b, 12c, 13a, 13b, and 13c are two examples of S( ) s-boxes designed for the invention.

DETAILED DESCRIPTION OF THE PREFERRED EMBODIMENTS OF THE INVENTION

Figure 1:
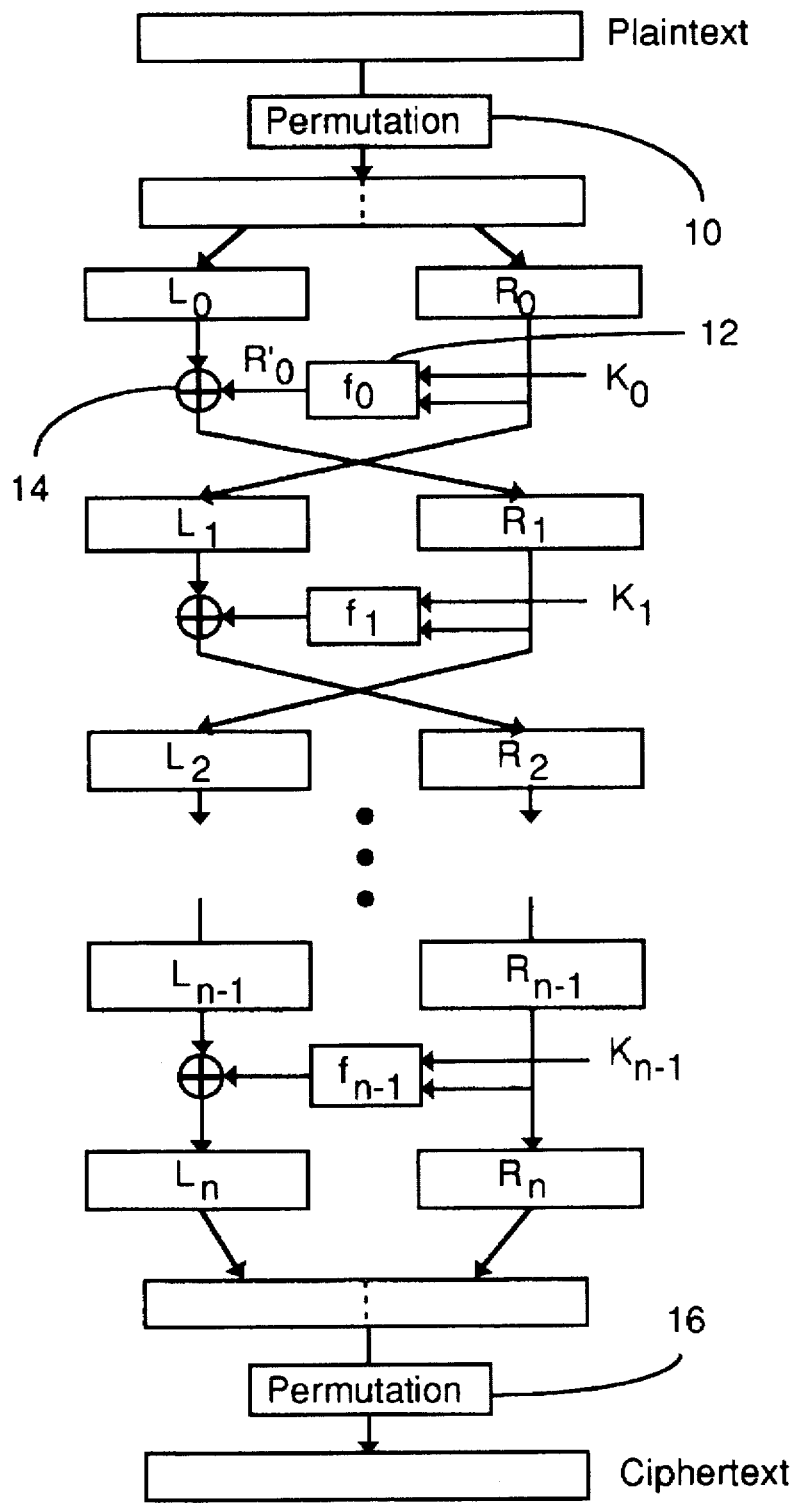
FIG. 1 is an algorithmic flow chart of the known DES encryption process.
Figure 2:
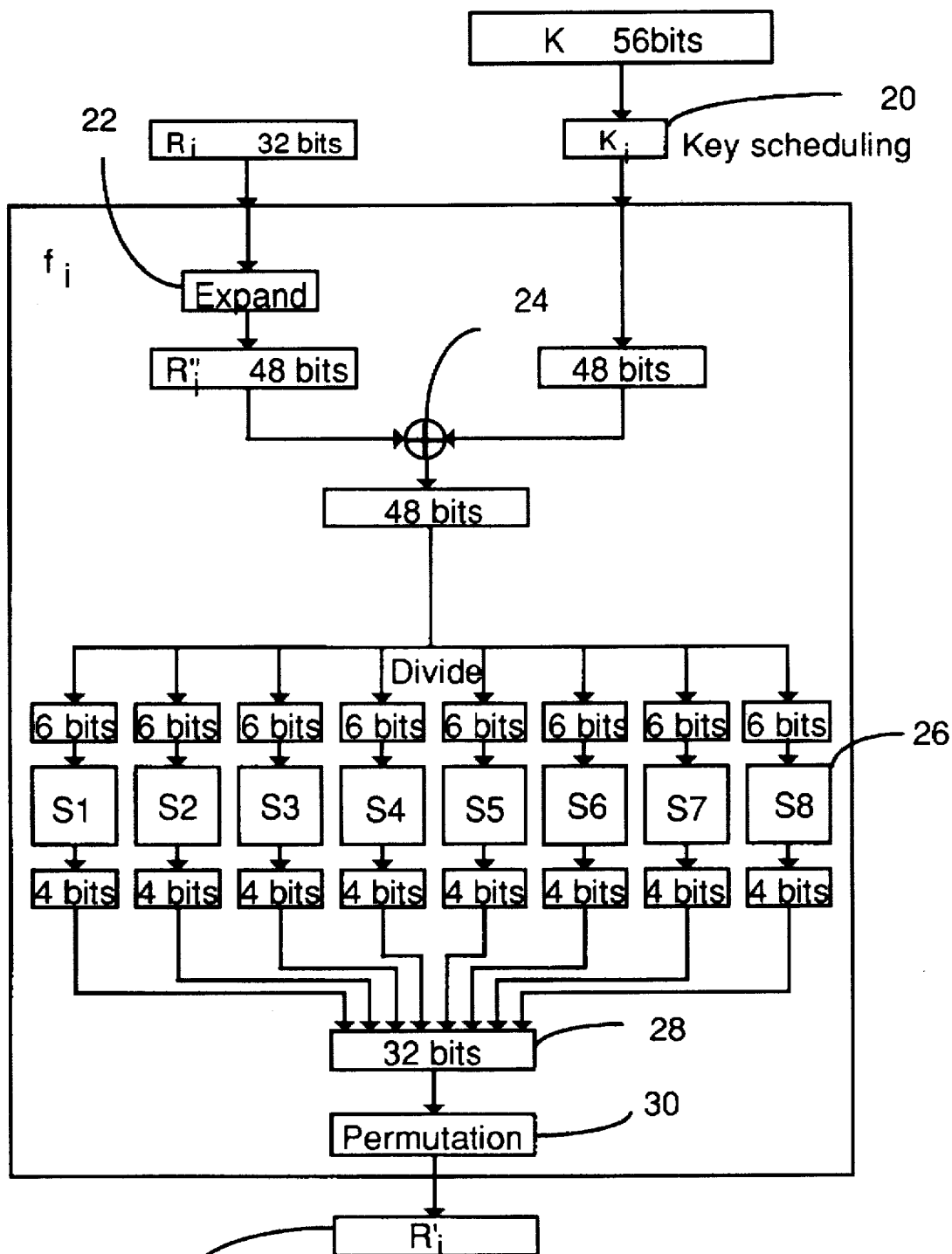
FIG. 2 is a detailed algorithmic illustration of a round function of DES.
Figure 3:
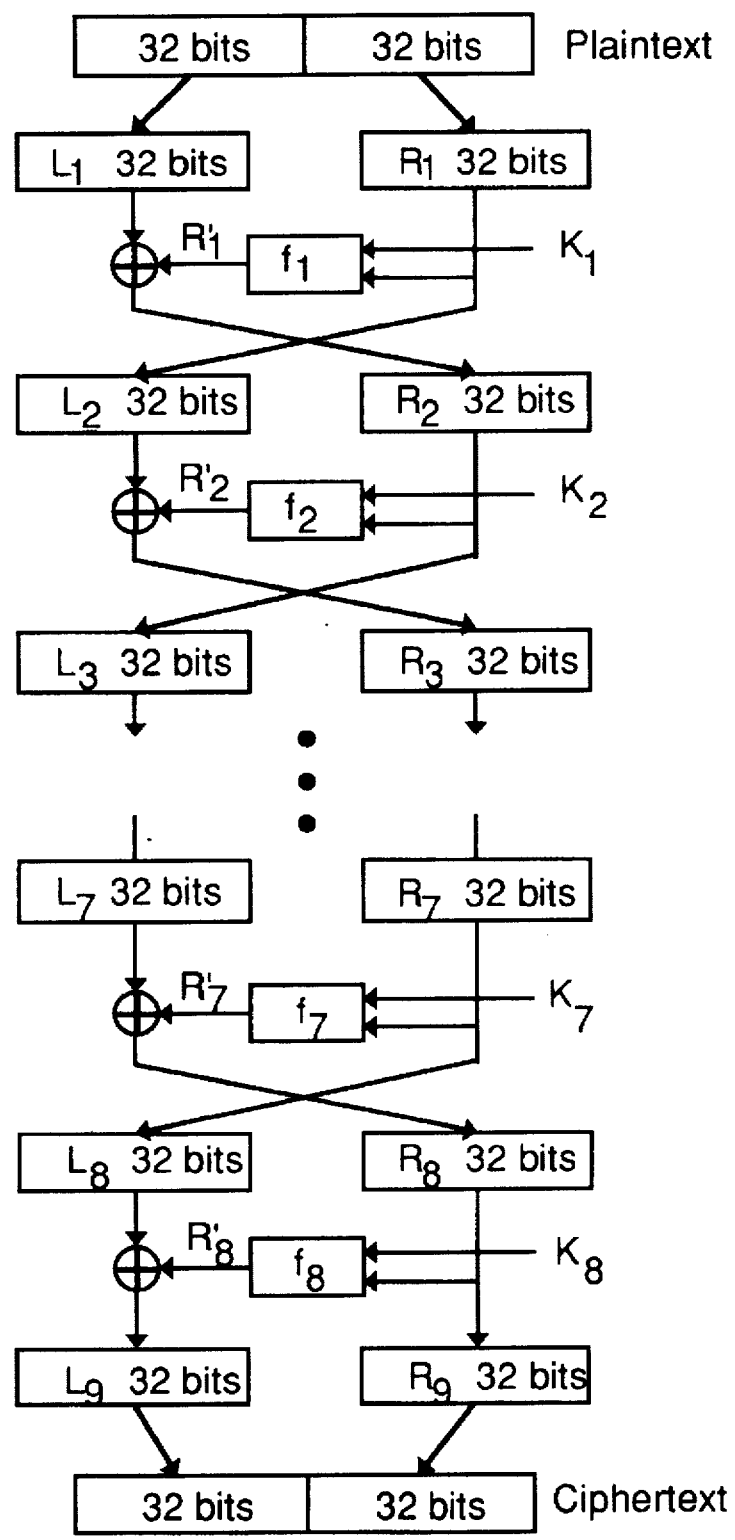
FIG. 3 is an algorithmic flow chart of a known CAST encryption process.
Figure 4:
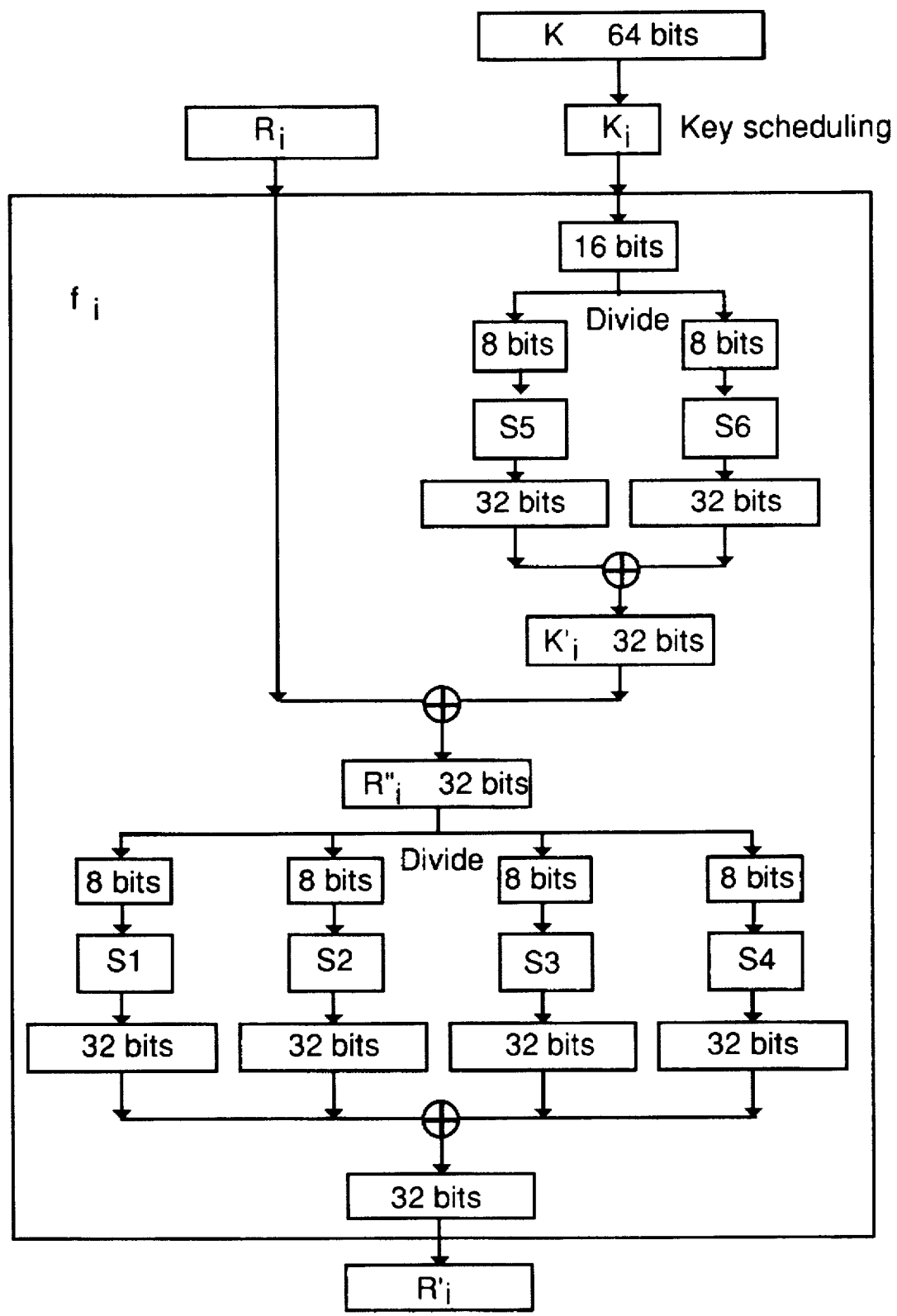
FIG. 4 is an algorithmic flow chart of a round function of known CAST.
Figure 5:
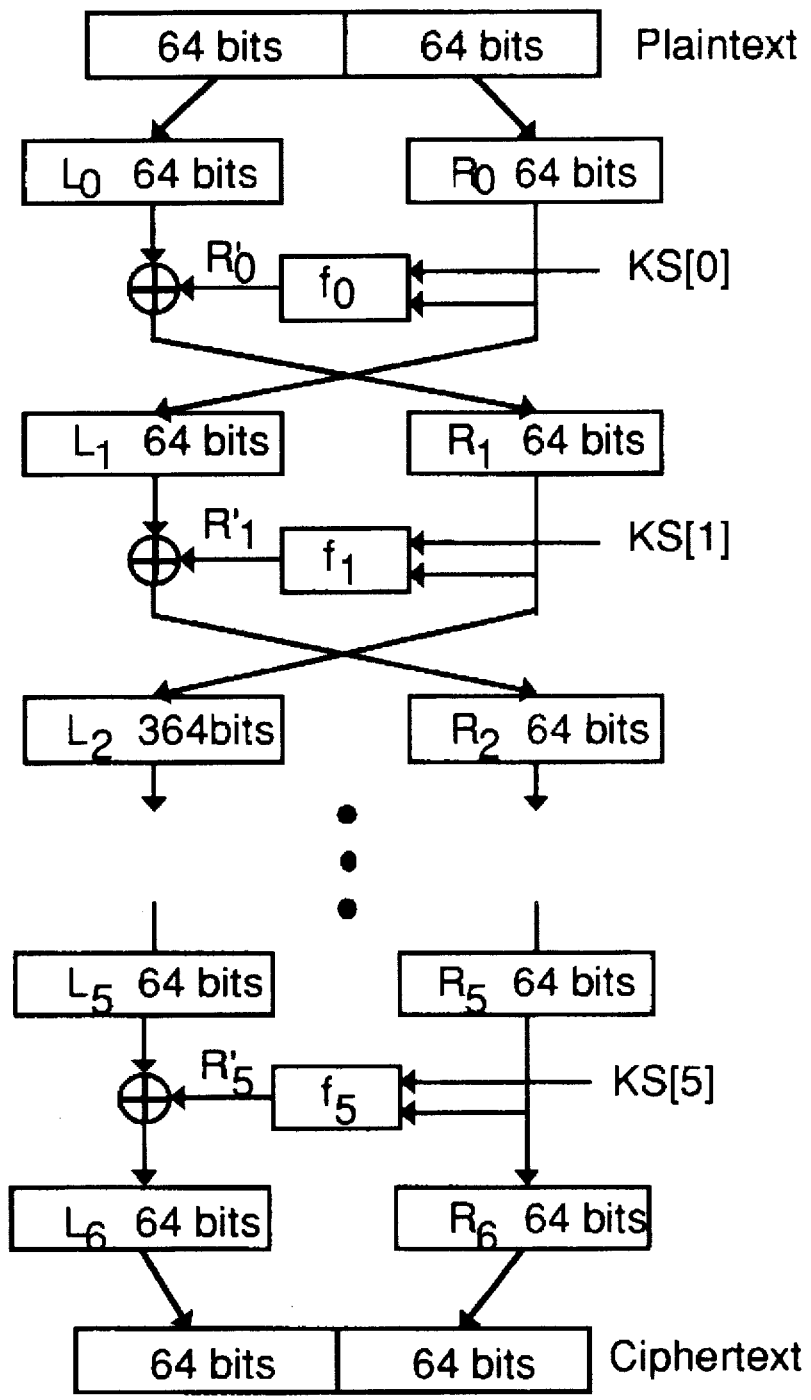
FIG. 5 is an algorithmic flow chart of the present invention according to one embodiment.
Figure 6:
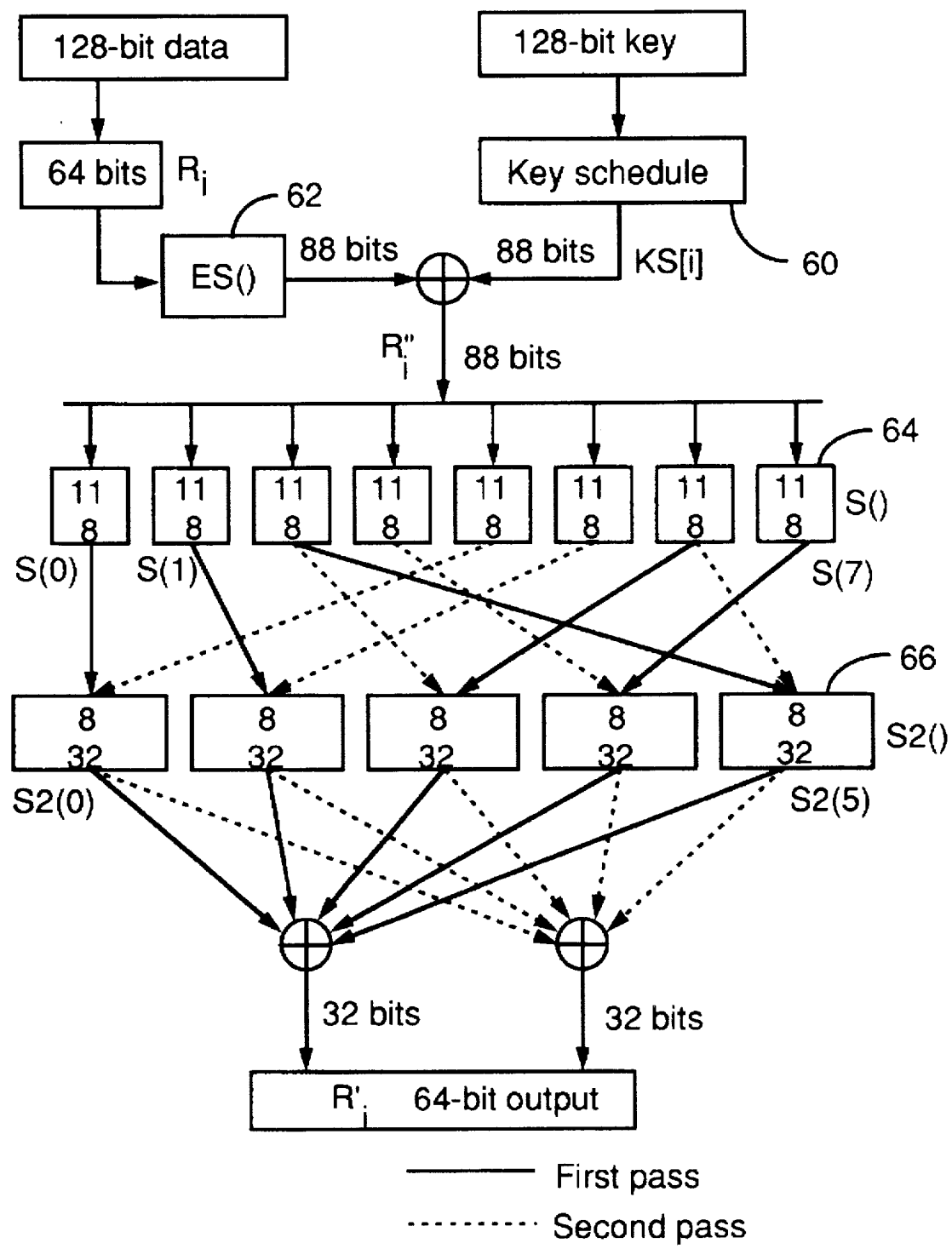
FIG. 6 is a detailed algorithmic illustration of a round function of one embodiment of the invention.

FIGS. 5 and 6 illustrate the algorithmic flow charts of the encryption process according to one embodiment of the invention. Referring specifically to FIG. 5, it is shown that a 128-bit block of plaintext is divided into two 64-bit halves, $L_0$ (left) and $R_0$ (right). At the first round, $R_0$ is modified by using an internal key KS[0 ] at round function $f_0$. The key scheduling to generate a specific internal key for each round will be described in detail below. The output of $f_0$ is $R'_0$, which is added modulo 2 to the left half data block $L_0$ to derive a transformed half data block. The transformed half data block is now used for an input $R_1$ for the second round. $R_0$ is used directly for the left half data block $L_1$ for the second round. The same process is repeated for 6 rounds to generate $L_6$ and $R_6$ which are concatenated to form the ciphertext.

FIG. 6 shows in detail one embodiment of the round function $f_i$ for round i, using the same parameters as those in FIG. 5. According to this embodiment, by using a specific key scheduling mechanism 60, internal key KS[i ] with a length of 88 bits is selected from the 128-bit key K. Meanwhile the half data block $R_i$ is expanded to 88 bits by an expansion function ES( ) 62 which will be described in detail below. The expanded half data block and KS[i ] are XORed to produce a first modified half data block $R''_i$ of 88 bits in length, which is divided into eight pieces and put through two different sets of s-boxes S( ) and S2( ). S( ) and S2( ) are from different classifications, e.g., S( ) comprises eight 11×8 s-boxes 64, e.g. S(0), S(1), . . . and S(7), and S2( ) comprises five 8×32 s-boxes 66, e.g., S2(0), S2(1), . . . and S2(4). On the first pass, five of eight outputs of S( ) are input to S2( ) and on the second pass a different five of the eight outputs of S( ) are put through S2( ). One example selection of five outputs are shown in FIG. 5 by solid and dotted lines. The outputs of S2( ) on each pass are XORed separately and concatenated together to produce a second modified half data block $R'_i$, 64 bits long.

Figure 7:
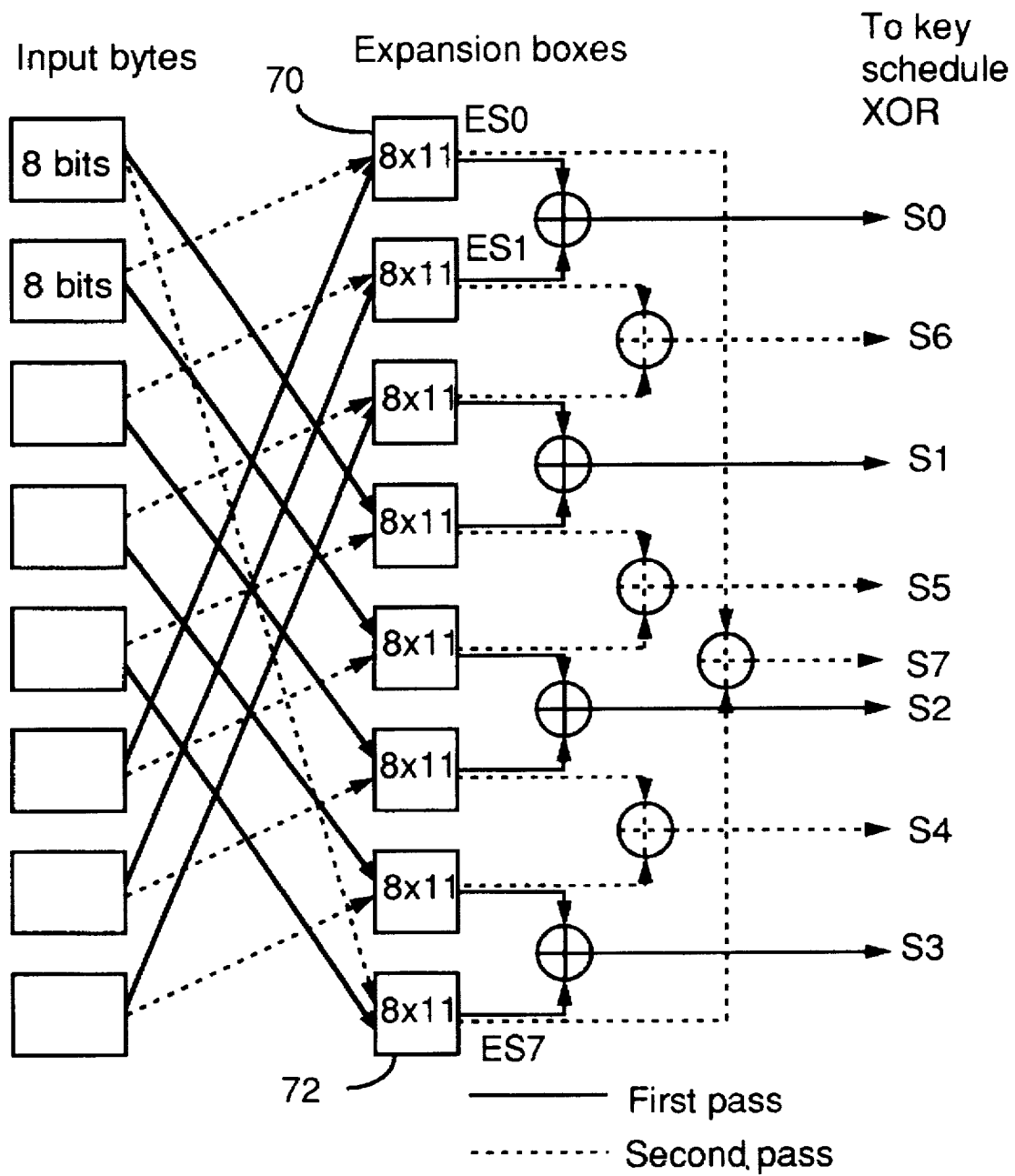
FIG. 7 is a detailed algorithmic illustration of an expansion function according to one embodiment of the invention.

Referring to FIG. 7, the expansion function ES( ) in which the half data block of 64 is divided into eight 8-bit pieces 70 and each piece is put through different one of eight ES s-boxes 72 on each of two passes, is shown in detail. ES s-boxes are 8×11 s-boxes, e.g., ES0, ES1, . . . and ES7. The outputs of ES s-boxes are XORed on each of the two passes to produce outputs S0, S1, S2, . . . S7 which are concatenated together to produce an expanded half data block. Example selections of s-boxes and XORing pairs are shown in the figure by solid and dotted lines.

The S2( ) function provides an extra stage of confusion and diffusion within the round function. It increases the overall complexity of differential cryptanalysis, reducing the single round, single s-box probability from $1.46 \times 10^{-2}$ to $8.82 \times 10^{-7}$ ($0.0146*(0.0078)^2$). This is shown in recent results by J. Lee, H. Heys, S. Tavares, in "On the Resistance of the CAST Encryption Algorithm to Differential Cryptanalysis", SAC '95: Workshop Records, pages 107–119, which describes the differential cryptanalysis properties of random 8×32 s-boxes.

Since the contents of the S2( ) s-boxes are unknown to the cryptanalyst, both linear and differential cryptanalysis are significantly hampered.

Key Scheduling

Keying is a crucial aspect of cryptosystem design. A key schedule that provides some guarantee of key/ciphertext Strict Avalanche Criterion (SAC) and Bit Independence Criterion (BIC) is required. That is, each ciphertext bit should depend in a complicated, nonlinear way on every key bit and any change in the key should cause each ciphertext bit to change with probability one half, virtually independently of the other ciphertext bits. On the other hand, it is preferable from an implementation standpoint that the key schedule is as simple as possible.

Key Schedule Generation (Subkey Generation)

According to one embodiment of the invention, subkeys are generated in such a way that if a given subkey is determined by cryptanalysis, it is cryptographically difficult to determine the other subkeys from the known subkey.

According to one embodiment of the invention, the subkeys are generated by using the present encryption function described above in reference to FIGS. 5-7 as a pseudo-random number generator, using the key as a seed. In particular, they are generated in a multi-step process which will be described below.

Figure 8:
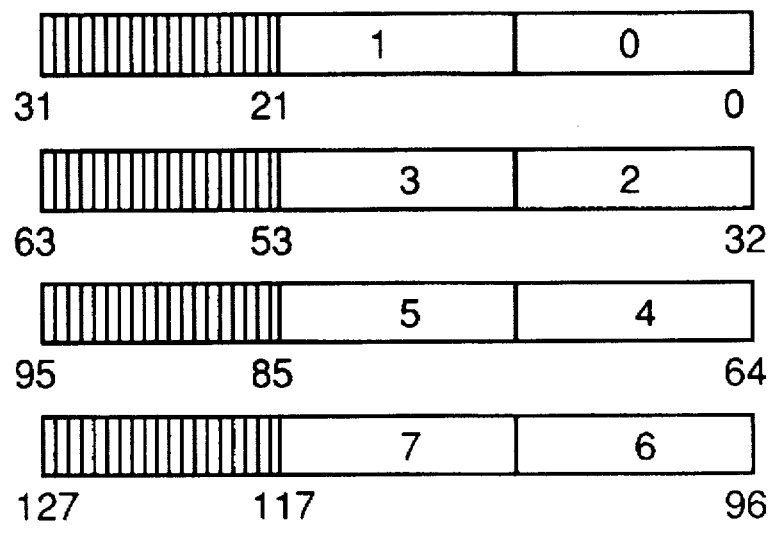
FIG. 8 is a bit arrangement of a key according to one embodiment of the invention.

First, a "standard" key schedule is loaded into the transformation function of the present invention, the standard key schedule is derived from the first 48 entries in table 0 and table 7 in the ES( ) function, combined with XOR. This standard key schedule is then perturbed by selecting bits from the input key as shown in FIG. 8, and XOR combining them with the "standard" key schedule, 11 bits at a time. A total of 88 bits from the input key are selected for use in perturbing the "standard" key schedule, as follows:

| Round | 0 | 1 | 2 | 3 | 4 | 5 | 6 | 7 |
| --- | --- | --- | --- | --- | --- | --- | --- | --- |
| 1 | 4CC | 079 | 4AA | 7BC | 6C8 | 573 | 3DE | 5EC |
| 2 | 63F | 6EF | 2BF | 1AE | 7F2 | 253 | 595 | 42E |
| 3 | 5E3 | 24B | 7CB | 1D9 | 324 | 341 | 2E6 | 1E2 |
| 4 | 142 | 47C | 26D | 593 | 151 | 028 | 23D | 004 |
| 5 | 527 | 39F | 30C | 217 | 01D | 7A6 | 55B | 1DB |
| 6 | 7FA | 271 | 64E | 4B4 | 316 | 53A | 2B8 | 3A9 |

Each row in this table is XORed with the corresponding (0 through 7) 11-bit value extracted from the key. This slightly-perturbed key schedule (phase one key schedule) is then used in a feedback execution of the transformation function of the invention to produce a new key schedule.

Figure 9:
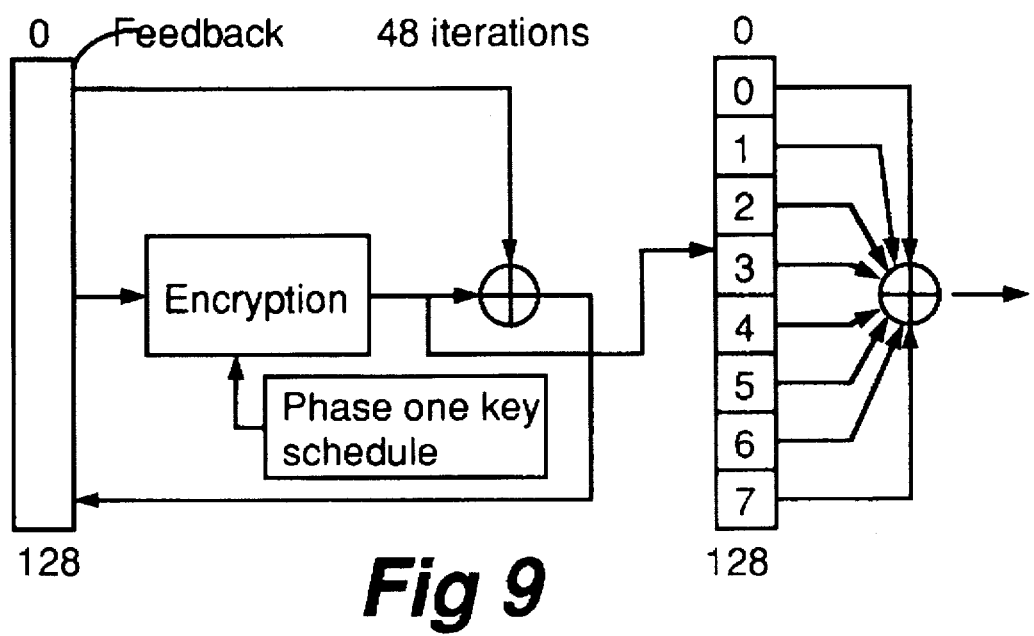
FIG. 9 is a detailed algorithmic illustration of key scheduling process according to one embodiment of the invention.

Referring to FIG. 9, the feedback begins by using the key as the initial plaintext, on each iteration, the feedback buffer is updated by XOR with the ciphertext output. This phase-two key schedule is produced by using each output of the feedback execution of the transformation function to produce 11-bit key schedule elements that update the phase-one schedule by one element on each iteration, for a total of 48 iterations.

The final key schedule is produced by again using the transformation function of the invention in a feedback mode, with the input key as the initial cleartext, using the phase two key schedule, and the standard S2( ) function. Each ciphertext output is considered as eight 16-bit values, each of which is XORed together, then masked down to 11 bits to produce a key-schedule element. This process is repeated until all of the key-schedule elements have been filled. There are 8 11-bit elements per round, with 6 rounds in the standard implementation, for a total of 48 key schedule elements or 528 key schedule bits.

Generation of the S2( ) Function

The S2( ) function is computed in a similar fashion to the final key-schedule, using the transformation function of the invention in feedback mode. This feedback execution is a continuation of the feedback execution used in generating the final key-schedule. Each output of the transformation execution is considered as four 32bit values. The values are combined using XOR, with the resulting value being placed in the next available S2( ) table element. If the 32bit value has already been used in an S2( ) table element, it is discarded and a new value is generated.

There are five S2( ) tables, each with 256 entries, for a total of 1280 32bit elements.

FIGS. 10 and 11 are two examples of ES( ) s-boxes. They are 8×11 s-boxes, with no particular characteristics, except that no given output value is repeated over all eight s-boxes. Furthermore two examples of S( ) s-boxes are shown in the combined figures of FIGS. 12a, 12b and 12c and FIGS. 13a, 13b and 13c. These s-boxes have a maximum pairs-XOR count of 30, with a minimum hamming distance of 0.45215 from any linear Boolean vector. The value 30 corresponds to a single round probability of 0.0146.

Comparison of the Present Invention and DES Round Functions

The round function of DES takes a 32bit input, and computes a non-linear function of that 32bit input. It accomplishes this using four discrete steps. The 32bit data input is expanded using the E expansion, then mixed with the 48bit key-schedule bits. The resulting 48bit value is then non-linearly substituted using the eight 6×4 s-boxes. The final step is to permute the 32bit s-box output using the P permutation.

When examining the E expansion in DES, notice that it provides no guarantee that a given input bit can affect more than one s-box. This makes differential cryptanalysis easier, since single s-boxes can be "isolated" for differential cryptanalysis purposes.

The cryptographic significance of the P permutation is assumed to be for the purposes of improving the diffusion properties of the round function, since the E expansion provides rather less diffusion.

The present invention has the same basic structure in its round function as DES. The round function takes a 64bit input, expands it to 88 bits using the ES function, mixes it with the key, and non-linearly substitutes the 88-bits using eight 11×8 s-boxes. When examining the ES function, observe that each input bit affects two s-boxes, thus making differential cryptanalysis somewhat harder. The ES function also provides, as a secondary effect, a small amount of non-linearity, since it acts as a 16×11 s-box. The s-boxes of the invention, due to their size, provide a higher degree of resistance both to differential and linear cryptanalysis than DES.

In the present invention, the post s-box function, S2, corresponds roughly to the P permutation in DES. Observe that S2 provides a non-linear transform of the s-box outputs, while the P function in DES is entirely linear. The S2 function also improves resistance to both differential and linear cryptanalysis, since the S2 table elements are unknown to the cryptanalyst. Even if the cryptanalyst is able to determine the contents of S2, it is assumed that the analysis of random 8×32 s-boxes, as described in the article by Lee et al referred to above, would hold for the S2 function in the present invention.

What is claimed is:

1. In a data encryption method of cryptographically transforming between plaintext and ciphertext in data blocks of a predetermined bitlength in which the data blocks are processed one data block after another in sequence through a set of a plurality of consecutive transformation rounds, each consecutive transformation round comprising steps of:
   expanding a half of a data block;
   XORing the half of said data block with a subkey to generate a first modified half data block;
   processing the first modified half data block by two or more sets of a plurality of different substitution boxes to generate a second modified half data block; and
   XORing the second modified half data block with the remaining half of said data block to generate a transformed half data block of a transformation round.

2. The data encryption method of cryptographically transforming plaintext into ciphertext in data blocks of a predetermined bitlength according to claim 1, wherein the consecutive transformation rounds in a set are even in number and performed in sequence in which the transformed half data block of one round is used as an input for the next round of transformation.

3. The data encryption method of cryptographically transforming plaintext into ciphertext in data blocks of a predetermined bitlength according to claim 2, wherein the step of expanding the half of said data block is performed in two passes, each pass comprising steps of:
   processing the half of said data block by another set of a plurality of (m×n) s-boxes where m and n are different integers; and
   XORing the outputs of the other set of s-boxes in a specific combination.

4. The data encryption method of cryptographically transforming between plaintext and ciphertext in data blocks of a predetermined bitlength according to claim 3, wherein the two or more sets of a plurality of different substitution boxes are of different classifications and the step of processing comprises a step of passing the first modified half data block through the two or more sets of a plurality of different substitution boxes in more than one pass.

5. The data encryption method of cryptographically transforming between plaintext and ciphertext in data blocks of a predetermined bitlength according to claim 4, wherein after a predetermined even number of transformation rounds, the transformed half data block of the final transformation round is concatenated with the remaining half of the data block to generate the ciphertext.

6. The data encryption method of cryptographically transforming plaintext into ciphertext in data blocks of a predetermined bitlength according to claim 4, wherein a set of the subkeys for the consecutive transformation rounds is generated from a key according to a method comprising steps of:
   transforming the key through the plurality of consecutive transformation rounds defined in claim 4 by using a preset key schedule to generate an intermediate subkey;
   after each transformation round, replacing a part of the preset key schedule with a part of the intermediate subkey; and
   repeating a predetermined number of transformation rounds to generate the set of subkeys.

7. The data encryption method of cryptographically transforming between plaintext and ciphertext in data blocks of a predetermined bitlength according to claim 3, wherein after a predetermined even number of transformation rounds, the transformed half data block of the final transformation round is concatenated with the remaining half of the data block to generate the ciphertext.

8. The data encryption method of cryptographically transforming plaintext into ciphertext in data blocks of a predetermined bitlength according to claim 3, wherein a set of the subkeys for the consecutive transformation rounds are generated from a key according to a method comprising steps of:
   transforming the key through the plurality of consecutive transformation rounds defined in claim 3 by using a preset key schedule to generate an intermediate subkey;
   after each transformation round, replacing a part of the preset key schedule with a part of the intermediate subkey; and
   repeating a predetermined number of transformation rounds to generate the set of subkeys.

9. The data encryption method of cryptographically transforming plaintext into ciphertext in data blocks of a predetermined bitlength according to claim 1, wherein a set of the subkeys for the consecutive transformation rounds are generated from a key according to a method comprising steps of:
   transforming the key through the plurality of consecutive transformation rounds defined in claim 1 by using a preset key schedule to generate an intermediate subkey;
   after each transformation round, replacing a part of the preset key schedule with a part of the intermediate subkey; and
   repeating a predetermined number of transformation rounds to generate the set of subkeys.

10. In a symmetric cryptographic encryption, a method of generating a key schedule from a key of a predetermined bitlength, comprising steps of:
    processing the key through a block cipher operation using a preset key schedule to generate an intermediate key schedule, each block cipher operation comprising a plurality of iterative transformation rounds each of which in turn includes a round function;
    after each block cipher operation, replacing a part of the preset key schedule with a part of the intermediate key schedule; and
    repeating a predetermined number of block cipher operation to generate the key schedule.

11. The method according to claim 10, wherein each iterative transformation round comprises steps of:
    processing a first half of an output of a preceding transformation round through the round function with the preset key schedule;
    XORing the processed half of the output with the remaining half of the output; and
    concatenating the first half and the XORed half of the output to generate a processed output of an iterative transformation round.

12. The method according to claim 11, wherein the round function comprises steps of:
    processing the first half of the output of the preceding transformation round by a first set of a plurality of substitution boxes;

XORing the processed half with a subkey which is derived from the preset key schedule to generate a first intermediate output half; and processing the first intermediate output half by one or more sets of a plurality of substitution boxes to generate the processed half of the output.

13. The method according to claim 12, wherein the step of processing the first intermediate output half comprises a step of passing the first intermediate output half through two stages of different sets of substitution boxes.

14. The method according to claim 13, wherein the step of passing the first intermediate output half is performed in two passes.

15. The method according to claim 13, wherein all the substitution boxes are of the kind "m×n" s-boxes where m and n are positive integers but are different from one another.

16. A data encryption system for cryptographically transforming between plaintext and ciphertext in data blocks of a predetermined bitlength by performing a plurality of consecutive transformation rounds of half of each data block, comprising:

a first set of a plurality of "m×n" s-boxes where m and n are different integers for processing each half data block to expand the same to a predetermined bitlength;

a first XOR gate for XORing a subkey and the expanded half data block to generate a first transformed half data block of the transformation round;

a second set of "p×q" s-boxes and a third set of "q×r" s-boxes where p, q and r are different integers for processing the first transformed half data block to generate a second transformed half data block; and a second XOR gate for XORing the second transformed half data block to generate a transformed half data block of one of the consecutive transformation rounds.

* * * * *